C. A. WIBERG.
VEHICLE GEAR.
APPLICATION FILED SEPT. 9, 1912.
1,163,731.
Patented Dec. 14, 1915.
2 SHEETS—SHEET 1.
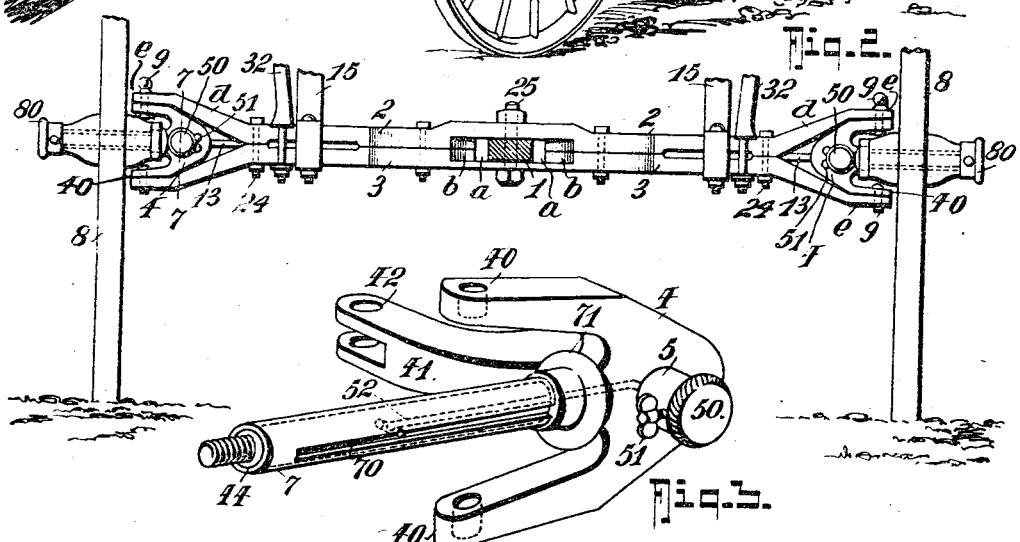
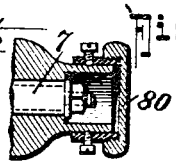
WITNESSES:
John J. Schrott
H. Woodard
INVENTOR
Charles A. Wiberg
BY
Fred G. Dieterich
ATTORNEYS

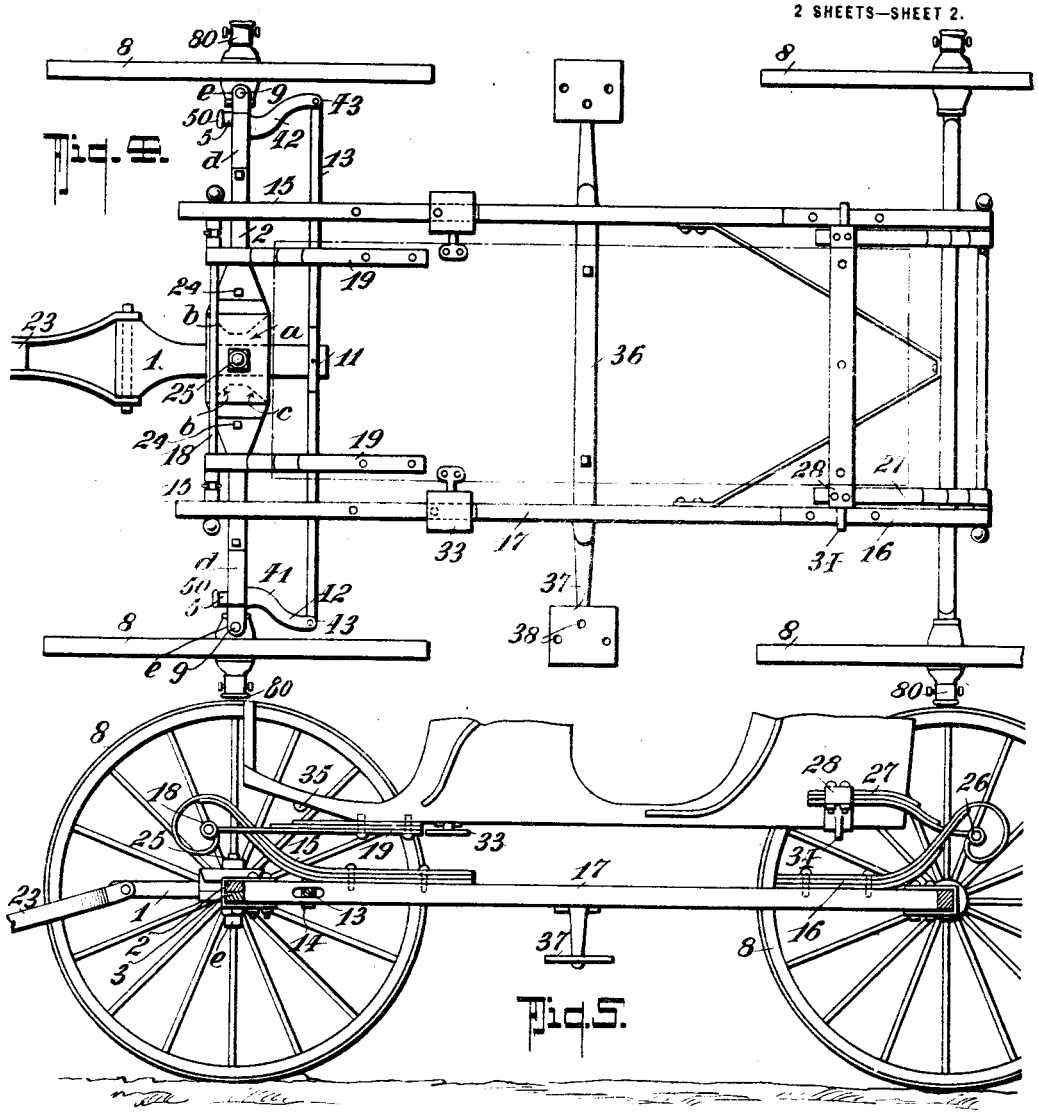

UNITED STATES PATENT OFFICE.

CHARLES A. WIBERG, OF CHISAGO CITY, MINNESOTA.

VEHICLE-GEAR.

1,163,731.     Specification of Letters Patent.     Patented Dec. 14, 1915.

Application filed September 9, 1912. Serial No. 719,338.

*To all whom it may concern:*

Be it known that I, CHARLES A. WIBERG, residing at Chisago City, in the county of Chisago and State of Minnesota, have invented certain new and useful Improvements in Vehicle-Gear, of which the following is a specification.

My present invention which generally relates to improvements in short turning gear for carriages, wagons and the like, more particularly has reference to the type of short turn vehicle gear disclosed in my patent dated March 5, 1912, No. 1,019,108, and my said present invention primarily has for its purpose to provide a new design and arrangement of the mechanism generally disclosed in my patent aforesaid whereby the efficiency thereof is greatly enhanced, and the cost of manufacture materially reduced.

Another object of my present invention is to provide for a simplified and practical means of mounting the wagon body and for the convenient application of mud guards for the front wheels of the vehicle.

With other objects in view that will hereinafter appear my present invention embodies the peculiar arrangement and novel combination of parts all of which will be hereinafter fully explained, specifically pointed out in the appended claim and clearly illustrated in the accompanying drawings in which:—

Figure 1, is a perspective view of a vehicle with running gear constructed in accordance with my invention. Fig. 2, is a front elevation of the front axle with the improved attached parts (the tongue member being shown in section). Fig. 3, is a perspective view of one of the axle carrying heads or knuckle members hereinafter specifically explained. Fig. 4, is a plan view of my complete improved running gear, the body supporting springs being also shown. Fig. 5, is a side elevation of the mechanism shown in Fig. 4, a portion of the vehicle body being also indicated. Fig. 6, is a detail perspective view of the rod that connects the opposite knuckles or axle carrying heads. Fig. 7, is a detail cross section on the line 7—7 on Fig. 2. Fig. 8 is a detail view of the hub dust cap.

In carrying out my present invention I provide a front axle formed of two sections designated 2—3 in the drawings, each of which is formed with a centrally disposed offset whereby, when the two parts are assembled, a horizontal slotway $a$ is provided, whose opposite ends terminate in opposing bevel-like shoulders $b$—$c$ (see Fig. 4) the purpose of which will presently appear. At the opposite ends the axle sections terminate in oppositely inclined portions $d$, which form bifurcated bearings $e$ having apertures for the stud pins 9, that constitute the pivots for the bifurcated ends 40 of the axle carriers or rocker heads 4, the detailed construction of which is best shown in Figs. 1 and 3, by special reference to which it will be noticed the rocker head 4 has a stub axle 44 integral therewith and a rearward extension or arm 41, the outer end of which terminates in apertured ends 42, for receiving the pins 43 that connect the ends of the single transverse rod 13, presently again referred to. Axle 44 has a lateral opening projecting into a slot 70 of the axle skein 7 that slips onto the axle and whose inner end carries a dust cap or guard 71, as shown.

Coöperating with each of the rocker heads 4 is a lubricating means in the nature of a compression grease cup, that includes the grease holder 5, the adjustable plunger cap 50, a set screw 51 for holding the cup to its adjusted position and the feed channel 52 that extends down along the axle to feed the lubricant between it and the axle skein.

The axle members 2 and 3 are made fast as one by the bolts 24. The wheels 8 are mounted on the axles and held by the axle nuts in the ordinary manner.

1 designates a tongue section which acts as a fifth wheel, it having an extension 11 that passes through the slot $a$ in the front axle and is pivotally held on the king bolt 25, its rearwardly extending portion 11 passing into the slot 14 of the single transverse bar 13, as is clearly shown in Figs. 1 and 2.

By reason of the peculiar and novel arrangement of the gear mechanism so far as described it will be readily apparent that when the vehicle is turning, the lateral sweep of the pole 23 will shift the transverse bar 13 in the required direction and in consequence turn the front wheels 8 to cause the front end of the vehicle to make the quick and desired short turn, the side turning of the said wheels being held from scraping the vehicle body by reason of the beveled stop shoulders *b—c* with which the tongue member engages when swinging too far laterally.

In the complete arrangement of my present invention, I mount the wagon body on two sets of springs, those at the front end being designated 15 and those at the rear end 16. The springs 15 are of the laminated type and are clipped or otherwise fastened on the forward end of the side or reach bars 17 of the running gear, the free ends thereof being connected to a cross rod 18 to which a second set of springs 19 are joined that are secured to the bottom of the front portion of the vehicle body. Springs 16 are likewise joined by a cross rod 26 to which connect a second set of springs 27 that extend forwardly over the sides of the rear ends of the vehicle body and are bolted to side brackets 28 secured to the said body, as clearly shown in Figs. 1 to 4.

To take up excess strain on the body supporting springs when going over very rough road surfaces the vehicle body has bumpers 33—34 and to further avoid undue strain on the forward springs cushion bumpers 35 are secured on the under side of the front end of the said vehicle body, as shown.

36 designates a brace bar bolted to the side or reach bars, and 37 designate the side steps mounted in the lower ends of hangers bolted to the side or reach bars and the said steps have a series of apertures 38 to provide for the convenient attachment of the front wheel mud guards 39, the front ends of which are supported by stay members 32, secured to the front axle, see Fig. 1.

A suitable dust cap 80 may be secured over the wheel hub ends as indicated in detail in Fig. 8.

From the foregoing taken in connection with the accompanying drawings, the complete construction and arrangement of the parts that constitute my invention and the advantages thereof will be readily apparent.

What I claim is:

In a short turn gear; a front axle consisting of two bars 2—3, bolts 24 securing said bars flatwise together, the ends *d* of said bars diverging, said bars having central recesses to form a central slot *a*, the side walls *b* of which are beveled to form tongue movement limiting stops, a tongue section 1 passing through said central slot, a bolt 25 on which said tongue section is pivoted in said slot, a knuckle bearing pivotally mounted in each end of said axle between the bifurcations of the same, and each of said knuckle bearings including an axle spindle 7 and a lateral member 41 that projects rearwardly relatively to the front axle, a single cross bar 13 having its ends pivotally connected to said rearward extensions 41 of the respective knuckle bearings, said single cross bar 13 having an elongated flat eye 14 intermediate its ends to receive the end of said tongue section 1, and a pivot passing through said eye 14 and said tongue section 1, and a draft tongue 23 pivoted on a horizontal axis to said tongue section 1, all being arranged substantially as shown and for the purposes described.

CHARLES A. WIBERG.

Witnesses:
CHARLES A. WALLMARK,
JENNIE WALLMARK.